United States Patent Office 3,493,576
Patented Feb. 3, 1970

3,493,576
PROCESS FOR THE PREPARATION OF NITRILES
Samuel E. Ellzey, Jr., Charles H. Mack, and William J. Connick, Jr., New Orleans, La., assignors to the United States of America as represented by the Secretary of Agriculture
No Drawing. Filed Oct. 27, 1966, Ser. No. 590,099
Int. Cl. C07d 29/32; C07c 121/12
U.S. Cl. 260—293
9 Claims

ABSTRACT OF THE DISCLOSURE

Nitriles are produced from the corresponding primary amides by reacting the latter with sodium borohydride. Where the amide contains an additional functional group which is reducible by sodium borohydride, it is possible in one operation, to bring about nitrile formation and reduction of the other functional group. If the amide contains substituent groups which are not reducible by sodium borohydride, it is then possible to produce a nitrile which contains the same substituent group.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to a novel process for preparing nitriles which may be repersented by the formula R—CN, wherein R may be an alkyl, aryl, aralkyl, heterocycloalkenyl, or a heterocycloalkyl radical, such as, for example, methyl, phenyl, benzyl, tetrahydropyridyl, or piperidyl.

More specifically, by the process of the persent invention nitriles of the above general type may be formed from the corresponding primary amides of the type R'—$CONH_2$, wherein R'=R as above, except that when R' is 3-pyridyl, R is 3-(1,4,5,6-tetrahydropyridyl) or 3-piperidyl.

The reagent used for this transformation is sodium borohydride, $NaBH_4$. Although the mechanism of this process is not completely clear, the overall effect brought about by the hydride is dehydration of primary amides to the corresponding nitriles. As will be apparent from the examples below, this process appears to be quite general in scope since it is applicable to primary amides which vary widely in structure.

Lithium aluminum hydride, $LiAlH_4$, is also capable of producing nitriles from primary amides as shown by Newman and Fukunaga [J. Am. Chem. Soc., 82, 693 (1960)]. In their procedure it is necessary, however, to use a *defficient* amount of reagent (one-half mole per mole of amide) in order to prevent reduction of the nitrile product to the corresponding amine. The reaction of nitriles with lithium aluminun hydride to form amines is nearly quantitative.

It is an advantage of the process herein described that it may be carried out in the presence of *excess* of the sodium borohydride reagent without producing appreciable quantities of the corresponding amine which would be produced by reduction of the nitrile moiety. It was determined in separate experiments that under the conditions used in the process of the present invention the nitrile groups of the products of this process were substantially unchanged after treatment with excess sodium borohydride. Other advantages will be apparent from the following discussion.

If the amide starting material contains a functional group which is reducible by sodium borohydride, it is then possible, in one operation, to bring about nitrile formation and reduction of the other functional group, such as, for example, a pyridine ring, or a keto or aldehyde group. Treatment of the same substituted amide with the less selective lithium aluminum hydride under conditions sufficient to reduce the other functional group, would very likely bring about reduction of any nitrile formed also.

If the amide starting material contains a functional group which is not reducible by sodium borohydride under the conditions of the process of this invention, it is then possible to produce a nitrile which contains the same functional group which was present in the original amide. Because of the stronger reducing properties of lithium aluminum hydride it would very likely be impossible to preserve intact the functional group present in the starting amide.

A further advantage of the process of this invention is that it may be used with primary amides whose molecular structures are such as to make them sensitive to the acidic conditions that are encountered in conventional methods of preparing nitriles from amides, employing, for example, thionyl chloride, phosphorus pentoxide, or the like, as the dehydrating agent. An example of such acid-sensitive amides are those containing olefinic double bonds; olefinic double bonds are not normally attacked by sodium borohydride.

It should be noted that by the process of the present invention it is possible to reduce (at least partially) selectively two of the three double bonds of a pyridine ring to produce a cyanotetrahydropyridine which would be rather difficultly accessible by other routes. This unexpected transformation may proceed by way of nicotinonitrile as an intermediate, since treatment of nicotinonitrile with excess sodium borohydride also leads to the formation of 3-cyano - 1,4,5,6 - tetrahydropyride. Another intermediate may be responsible for the formation of the fully saturated 3-cyanopiperidine, since none of the latter compound was isolated from the interaction of nicotinonitrile and sodium borohydride.

The process of the present invention involves heating a primary amide with sodium borohydride in a suitable solvent in which both reactants are soluble. The dimethyl ether of diethyleneglycol (diglyme) is the preferred solvent. The temperature limits for this process are from about 100° C. to about the boiling point of the solvent. The reaction proceeds at a reasonable rate when carried out in diglyme at its boiling point, 162° C. Other ether solvents, such as triglyme and tetraglyme, may also be used. Execess sodium borohydride is conveniently decomposed with acetic acid prior to isolation of the product nitriles but this step is not absolutely necessary, as the examples following will show.

When the reaction products are the lower alkyl nitriles formed from the lower alkanoic acid amides, they may be isolated from the crude reaction mixture by distillation as fast as they are formed. In most other cases it is preferable, because of the higher boiling points of the product nitriles, to dilute the crude reaction mixture with water and extract the resulting nitrile with ether and purify it by distillation. In other cases it may be advantageous to dilute the reaction mixture with ether, separate the inorganic material by filtration, and recover the product nitrile by distillation.

The use of the polyether solvent evidently affects the course of the reaction since Johnston (U.S. Patent 3,026,-355, Mar. 20, 1962) has reported that certain primary amides, when melted with sodium borohydride without a solvent, furnish primary *amines* and *not nitriles*.

The alkyl, aryl, or aralkyl nitriles formed by the process of the present invention are useful as solvents and chemical intermediates. Both nitriles derived from nicotinamide are useful as antimicrobial agents.

The following examples are given to illustrate the process of the present invention but are not to be construed as limiting its scope. All temperatures are degrees centigrade.

EXAMPLE 1

A mixture of 12.1 g. (0.10 mole) of benzamide, 4.18 g. (0.11 mole) of sodium borohydride and 80 ml. of dry diglyme was heated at reflux with stirring for one hour. Foaming occurred during about 45 minutes as the mixture became light yellow. The mixture was cooled and poured into 500 ml. of ice water, acidified with 100 ml. of 20% acetic acid, and saturated with salt before extraction with three 100 ml. portions of ether. After drying over sodium sulfate, the ether was evaporated and the mixture of diglyme, acetic acid and product was found to contain 6.10 g. (59% yield) of benzonitrile upon gas chromatographic analysis using a high vacuum silicone grease column. Distillation of the mixture gave two fractions, B.P. 156–170°, 6.06 g., and B.P. 170–184°, 4.90 g. The second fraction was identified as benzonitrile by its infrared spectrum and by hydrolysis to benzoic acid, M.P. and mixture M.P. 121–122°. A trace of solid material (needles from aqueous ethanol, M.P. 275–276°) was isolated from the distillation residue and identified as lophine (2,4,5-triphenylimidazole) by its infrared spectrum. Under similar conditions benzonitrile was recovered in 71% yield after treatment with excess sodium borohydride. When only benzamide and diglyme were refluxed one hour, a 75% recovery of amide was realized with no nitrile being formed.

EXAMPLE 2

To a well-stirred, refluxing slurry of 1.89 g. (0.05 mole) of sodium borohydride and 20 ml. of diglyme was added from a heated dropping funnel a solution of 6.75 g. (0.05 mole) of phenylacetamide in 30 ml. of diglyme. The rate of addition was slow enough to control the amount of hydrogen given off during the reaction and took about 15 minutes. After refluxing another 45 minutes the mixture was cooled and poured into 300 ml. of ice water before being treated with acetic acid and salt as in Example 1. After an ether extraction and drying step the crude product was found to contain 3.35 g. (58% yield) of phenylacetonitrile along with a large quantity of solvent and some acetic acid. Fractional distillation gave a fraction, B.P. 78–96° at 1 mm., with an infrared spectrum identical with that from pure phenylacetonitrile. When the nitrile was similarly treated with excess sodium borohydride, a 75% recovery of starting material was realized.

EXAMPLE 3

To a well-stirred, refluxing slurry of 3.78 g. (0.10 mole) of sodium borohydride in 50 ml. of diglyme was added over 30 minutes, a heated solution of 5.90 g. (0.10 mole) of acetamide in 30 ml. of diglyme. After a further one hour at reflux the product was slowly distilled from the mixture through a short Vigreaux column, B.P. 7990°, 2.75 g. Gas chromatography indicated a purity of about 98% (66% yield). The infrared spectrum was identical with that of an authentic sample of acetonitrile.

EXAMPLE 4

To a well-stirred slurry of 3.78 g. (0.10 mole) of sodium borohydride in 50 ml. of diglyme at 100° was added during 10 minutes 12.21 g. (0.10 mole) of solid nicotinamide. The yellow slurry was heated to 140° during five minutes whereupon a vigorous reaction began and a sticky orange solid precipitated. The mixture was rapidly cooled to 100° to moderate the reaction and then heated to the reflux temperature during 25 minutes. After refluxing an additional hour the mixture was cooled to −35° overnight before dilution with 200 ml. of ether. After filtering, the ether was removed on a steam cone and the residue was again diluted with 200 ml. of ether before cooling to −15° and filtering. After drying the ether solution over sodium sulfate, the ether and diglyme were distilled and the semi-solid residue was distilled at 3–3.5 mm., B.P. 83–100°, weight 1.71 g. Gas chromatographic analysis on a silicone grease column indicated that the product was contaminated with 9% diglyme, giving a total yield of 3-cyanopiperidine of 14%. Product from several runs was combined in aqueous hydrochloric acid and the diglyme was removed by ether extraction. The aqueous phase was made basic and then extracted with ether. After drying over sodium sulfate and distilling the ether, 3-cyanopiperidine was recovered as a colorless liquid, B.P. 77° at 2.5 mm., $n_D^{25}$ 1.4776.

*Analysis.*—Calcd. for $C_6H_{10}N_2$: C, 65.41; H, 9.15; N, 25.44; equiv. wt. 110.2. Found: C, 65.26; H, 9.35; N, 25.24; equiv. wt., 111.1.

The sample showed C≡N absorption at 4.44μ in CCl. Its N.M.R. spectrum, with and without added $D_2O$, was consistent with the assigned structure.

The residue from the distillation of the 3-cyanopiperidine was chromatographed in benzene on an alumina column and eluted with ether. Evaporation of the solvent and recrystallization from ether-petroleum ether (B.P. 30–60°) gave 1.82 g. (17% yield) of 3-cyano-1,4,5,6-tetrahydropyridine, M.P. 38–39°. An analytical sample melted at 39.5–40°.

*Analysis.*—Calcd. for $C_6H_8N_2$: C, 66.64; H, 7.45; N, 25.91. Found: C, 66.51; H, 7.50; N, 25.69.

The sample showed C≡N absorption at 4.59μ in KBr. Its N.M.R. spectrum, with and without added $D_2O$ was consistent with the assigned structure.

EXAMPLE 5

To a well-stirred slurry of 3.8 g. (0.1 mole) of sodium borohydride in 50 ml. of diglyme, heated to 100° was added in small portions over about 30 minutes 10.4 g. (0.1 mole) of solid 3-cyanopyridine. The reaction mixture, which became yellow immediately, was maintained at 95–105° with external cooling during the addition. After completion of the addition the mixture was maintained at 100° for an additional hour, after which it was cooled to room temperature before the addition of 200 ml. of ether. The lower, dark brown, oily layer was separated and dissolved in 100 ml. of water before acidifying with glacial acetic acid. Ether extraction, followed by distillation of the ether, gave 6.35 g. of liquid which was analyzed by gas chromatography. The analysis showed the presence of 1.40 g. of 3-cyano-1,4,5,6-tetrahydropyridine and 1.28 g. of the starting nitrile, in addition to diglyme. The ether layer from the original reaction mixture was distilled and the residue was analyzed by gas chromatography. In addition to diglyme, there was present 1.01 g. of 3-cyano-1,4,5,6-tetrahydropyridine and 0.94 g. of 3-cyanopyridine. The total yield of 3-cyano-1,4,5,6-tetrahydropyridine amounted to 22% and the total recovery of the starting material was 21%. Gas chromatography failed to indicate the presence of any 3-cyanopiperidine in either fraction of the reaction mixture.

We claim:

1. The process for preparing a nitrile of the formula R—CN, wherein R is a member of the group consisting of alkyl, aryl, and aralkyl, which process consists of reacting a primary amide of the formula

with an excess of sodium borohydride in a mutual solvent for the reactants and at a temperature of about from 100° C. to the boiling point of the solvent.

2. A process of claim 1 wherein the mutual solvent is the dimethylether of diethylene glycol.

3. The process of claim 2 wherein R′=R=$CH_3$.

4. The process of claim 2 wherein R′=R=$C_6H_5$.

5. The process of claim 2 wherein R′=R=$C_6H_5CH_2$.

6. A process for converting nicotinamide to 3-cyano-1,4,5,6-tetrahydropyridine and 3-cyanopiperidine, by reacting an excess of sodium borohydride in diglyme with nicotinamide.

7. A process for converting 3-cyanopyridine to 3-cyano-1,4,5,6-tetrahydropyridine, by reacting an excess of sodium borohydride in diglyme with 3-cyanopyridine.

8. A compound represented by the formula:

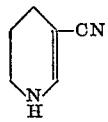

9. A compound represented by the formula:

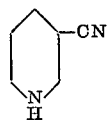

References Cited

Chemistry and Industry (London) No. 52, Dec. 24, 1966, Yamada et al. pp. 2169–2170.

Schenker et al., Helv. Chim. Acta 42, 1960–70 (1959).

HENRY R. JILES, Primary Examiner

G. T. TODD, Assistant Examiner

U.S. Cl. X.R.

260—293.2, 294.9, 465, 465.2, 999